(12) United States Patent
Richer et al.

(10) Patent No.: US 7,734,689 B2
(45) Date of Patent: Jun. 8, 2010

(54) SYSTEM AND METHOD FOR MANAGING PROCESSING OF A PLURALITY OF EVENTS THROUGH AN EVENT MANAGEMENT

(75) Inventors: Eric Richer, Banff (CA); Ron Godfrey, Okotoks (CA); Phil Denis, Calgary (CA); Warren Janssens, Calgary (CA)

(73) Assignee: Richer Systems Group Inc., Calgary (CA)

( * ) Notice: Subject to any disclaimer, the term of this patent is extended or adjusted under 35 U.S.C. 154(b) by 643 days.

(21) Appl. No.: 11/437,295

(22) Filed: May 19, 2006

(65) Prior Publication Data

US 2006/0277313 A1 Dec. 7, 2006

Related U.S. Application Data

(60) Provisional application No. 60/682,881, filed on May 20, 2005.

(30) Foreign Application Priority Data

May 20, 2005 (CA) .................................... 2508091

(51) Int. Cl.
*G06F 15/16* (2006.01)
(52) U.S. Cl. ..................................... 709/203

(58) Field of Classification Search .................. 709/204, 709/220–229, 246; 370/270, 465, 477, 351–358; 310/26–28; 705/1–5; 707/200–204
See application file for complete search history.

(56) References Cited

U.S. PATENT DOCUMENTS

| | | | |
|---|---|---|---|
| 5,768,506 A * | 6/1998 | Randell | 709/202 |
| 5,937,415 A * | 8/1999 | Sheffield et al. | 707/204 |
| 6,961,776 B1 * | 11/2005 | Buckingham et al. | 709/229 |
| 7,143,190 B2 * | 11/2006 | Christensen et al. | 709/246 |
| 2002/0198734 A1 * | 12/2002 | Greene et al. | 705/1 |

* cited by examiner

*Primary Examiner*—Nathan Flynn
*Assistant Examiner*—Mark O Afolabi
(74) *Attorney, Agent, or Firm*—Pearne & Gordon LLP

(57) ABSTRACT

A data brokering system and method for programming is provided. The data brokering system comprises a process module for executing process logic, a panel module for accessing external information, and a process-panel interface for defining a standard of communication between the process module and the panel module. The panel module communicates with the process module and the external information. The method comprises the steps of executing process logic, having the process logic communicating with a panel module to access external information, and defining a standard of communication between the process logic and the panel module.

39 Claims, 10 Drawing Sheets

SYSTEM AND METHOD FOR MANAGING PROCESSING OF A PLURALITY OF EVENTS THROUGH AN EVENT MANAGEMENT

This application claims the benefit of U.S. Provisional Application No. 60/682,881 filed May 20, 2005, the contents of which are incorporated herein by reference in their entirety.

FIELD OF THE INVENTION

The invention relates generally to software, and in particular to a system and method of data brokering.

BACKGROUND OF THE INVENTION

Typically, a computer program is created to perform a certain set of actions or functions, i.e., create a customer invoice, enter or update customer information, place a purchase order, generate reports, add or change information in a database, etc. Typical computer programs have process logic hard coded into them. Making changes to the process logic requires the information technology (IT) department to change the code to have the application function differently. Moreover, present computer programs typically require user interfaces to be created as part of the computer program. This requires repeated coding of these interfaces as each computer program is created.

FIG. 1 shows a diagrammatic representation of a typical computer program framework 10. The computer program framework 10 comprises a user interface module 12, a process logic 14, and a database 16. The user interface 12 enables a user to view and enter information. The process logic 14 manages the information flow to and from the user interface 12, performs the appropriate business logic and manages the information flow to and from the database 16. These program modules are normally written in a high level programming language which is compiled to run on a specific computer operating system. Changes to the computer program require the program code to be modified, re-compiled and then re-installed on the users' computer in order to take advantage of the newly implemented changes.

Computer programs are generally dedicated to a specific group of functions which deal with a defined database 16. Developers are creating new applications which combine multiple computer programs which access multiple databases and multiple functions.

FIG. 2 shows another diagrammatic representation of a typical computer program framework 20. The computer program framework 20 comprises two computer programs 10A, 10B, a system event management module 22, and a middleware module 24. The user programs 10A,10B comprise user interface modules 12A,12B, process logic 14A,14B, and databases 16A,16B. Other computer programs may be added to the computer program framework 20. The middleware module 24 and the system event management module 22 enable the various process logic 14 to communicate and interface with one another. This approach requires detailed knowledge of the workings of each computer program and its application. It is also challenging to work with different operating systems.

In both of the computer program framework examples above, functions are the primary focus of the user programs. Access to multiple databases at present requires middleware to sit between the various process logic 14 and must be set up prior to an application being created.

SUMMARY OF THE INVENTION

The invention transforms the traditional user interface—process logic—database paradigm into process logic—interface—database.

In accordance with an embodiment of the present invention, there is provided a data brokering system for programming. The data brokering system comprises a process module for executing process logic, a panel module for accessing external information, and a process-panel interface for defining a standard of communication between the process module and the panel module. The panel module communicates with the process module and the external information.

In accordance with another embodiment of the present invention, there is provided a method of data brokering for programming. The method comprises the steps of executing process logic, having the process logic communicating with a panel module to access external information, and defining a standard of communication between the process module and the panel module.

The data brokering system allows for programming to be designed using a process model in software application design rather than a transactional model. Advantageously, entities that operate a data brokering system can automate their business policies and procedures. External information, process logic, and panel modules may be independently modified without adversely affecting the other components. Advantageously, the data brokering system and method allows access to various data sources without each data source being aware of the other, and no middleware is required. Advantageously, the data brokering system and method utilize discrete panel modules that are independent of each other and independent of the process modules optimizing the creation of panel modules that can be used repeatedly by a plurality of process modules.

BRIEF DESCRIPTION OF THE DRAWINGS

An embodiment of the invention will now be described by way of example only with reference to the following drawings in which.

DETAILED DESCRIPTION OF THE PREFERRED EMBODIMENTS

Figure 1:
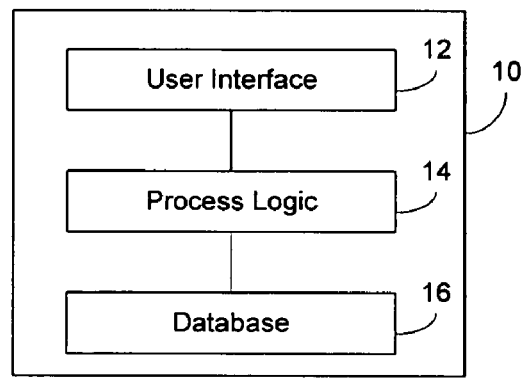
FIG. 1 shows a diagrammatic representation of a typical computer program framework.
Figure 2:
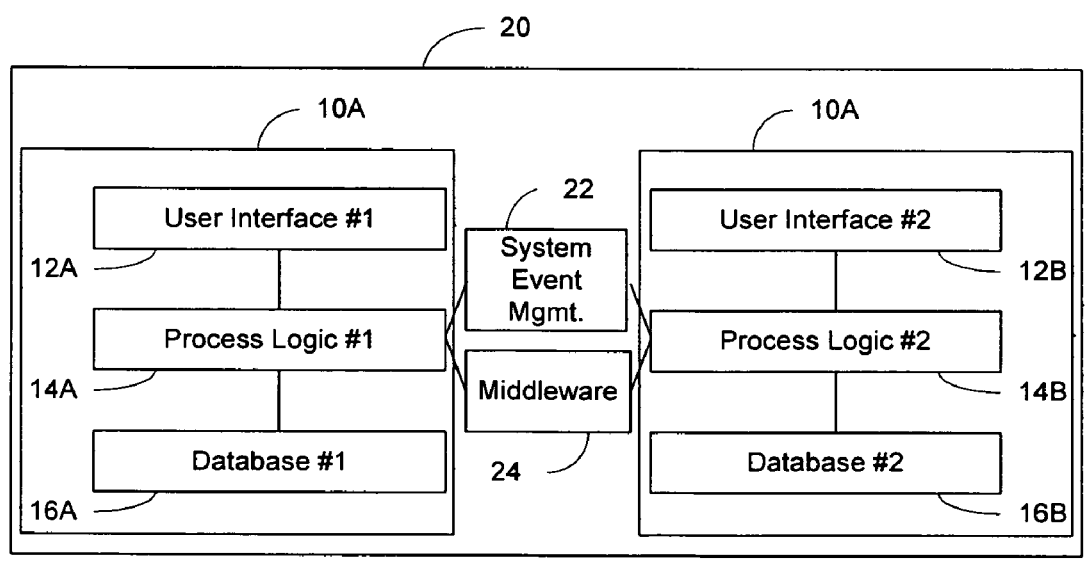
FIG. 2 shows another diagrammatic representation of a typical computer program framework.
Figure 3:
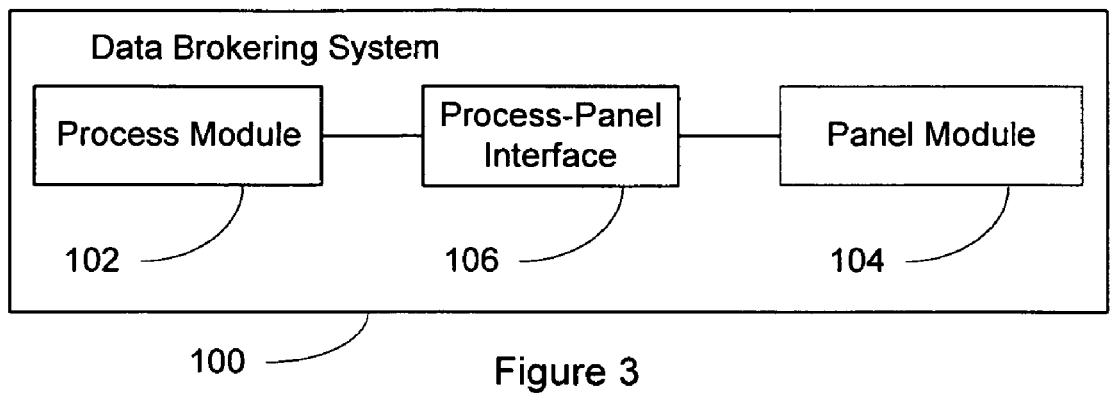
FIG. 3 shows an example of a data brokering system for programming, in accordance with an embodiment of the present invention.

FIG. 3 shows an example of a data brokering system 100 for programming, in accordance with an embodiment of the present invention. The data brokering system 100 comprises a process module 102 for executing process logic, a panel module 104 for accessing external information, and a process-panel interface 106 for defining a standard of communication between the process module 102 and the panel module 104. The process module 102 communicates with the panel module 104 through the process-panel interface 106. The panel module 104 communicates with the process-panel interface 106 and an external repository. Preferably, the information brokered is retrieved and stored from a database data file. Other components may be added to the data brokering system 100.

The process module 102 handles the process flow including spawning events to be acted upon by other users, calling up the desired panel modules 104, executing the business logic for the process and providing user dialogue linked to the process flow. Preferably, the process module 102 is written in a scripting language and can be easily modified to reflect changes in the process.

The panel module 104 provides for the retrieval and entry of database (or repository) information as well as providing the required levels of integrity checking for an associated database. In this way, no knowledge of any underlying user application is required. The process module 102 only needs to know the information contained in panel module views of the databases. Preferably, the panel modules are discrete windows into specific parts of a distinct database or repository.

Advantageously, since the process module 102 controls the data flow and calling of panel modules 104, the panel modules 104 are independent of each other, any corresponding process logic, and any related external data. This independence allows panel modules 104 to be composed from diverse applications, which eliminates need for middleware to meld process logic together. Moreover, database information, process logic, and panel modules 104 may be independently modified without adversely affecting the other components or the process module 102.

Figure 4:
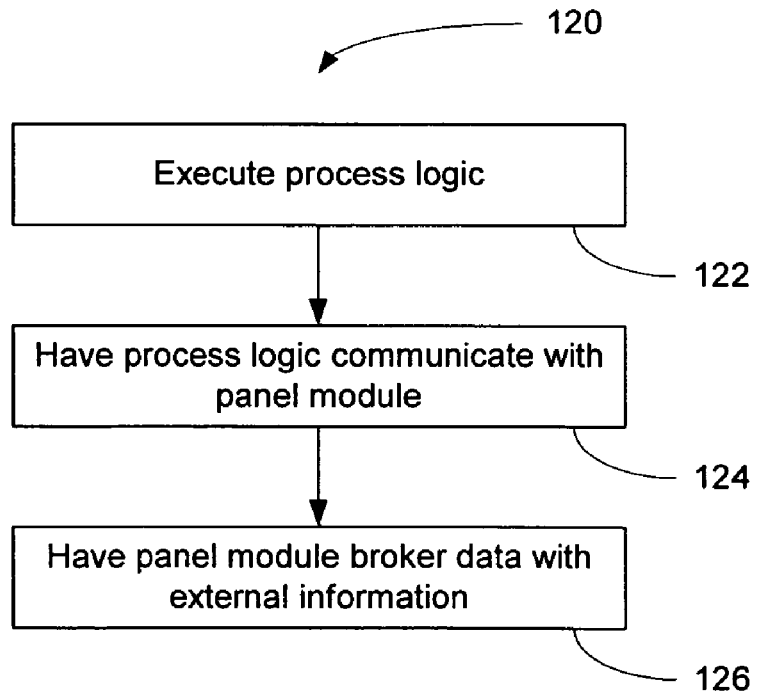
FIG. 4 shows in a flowchart an example of a method of data brokering for programming, in accordance with an embodiment of the data brokering system.

FIG. 4 shows an example of a method of data brokering for programming (120), in accordance with an embodiment of the data brokering system 100. The method (120) begins with the step of executing process logic (122). The process module 102 communicates with a panel module 104 (124) through a standard of communication. The panel module 104 accesses external information (126). Process flow is managed by the process module 102, while the information access between the panel module 104 and the external repository is managed by the panel module 104.

Figure 5:
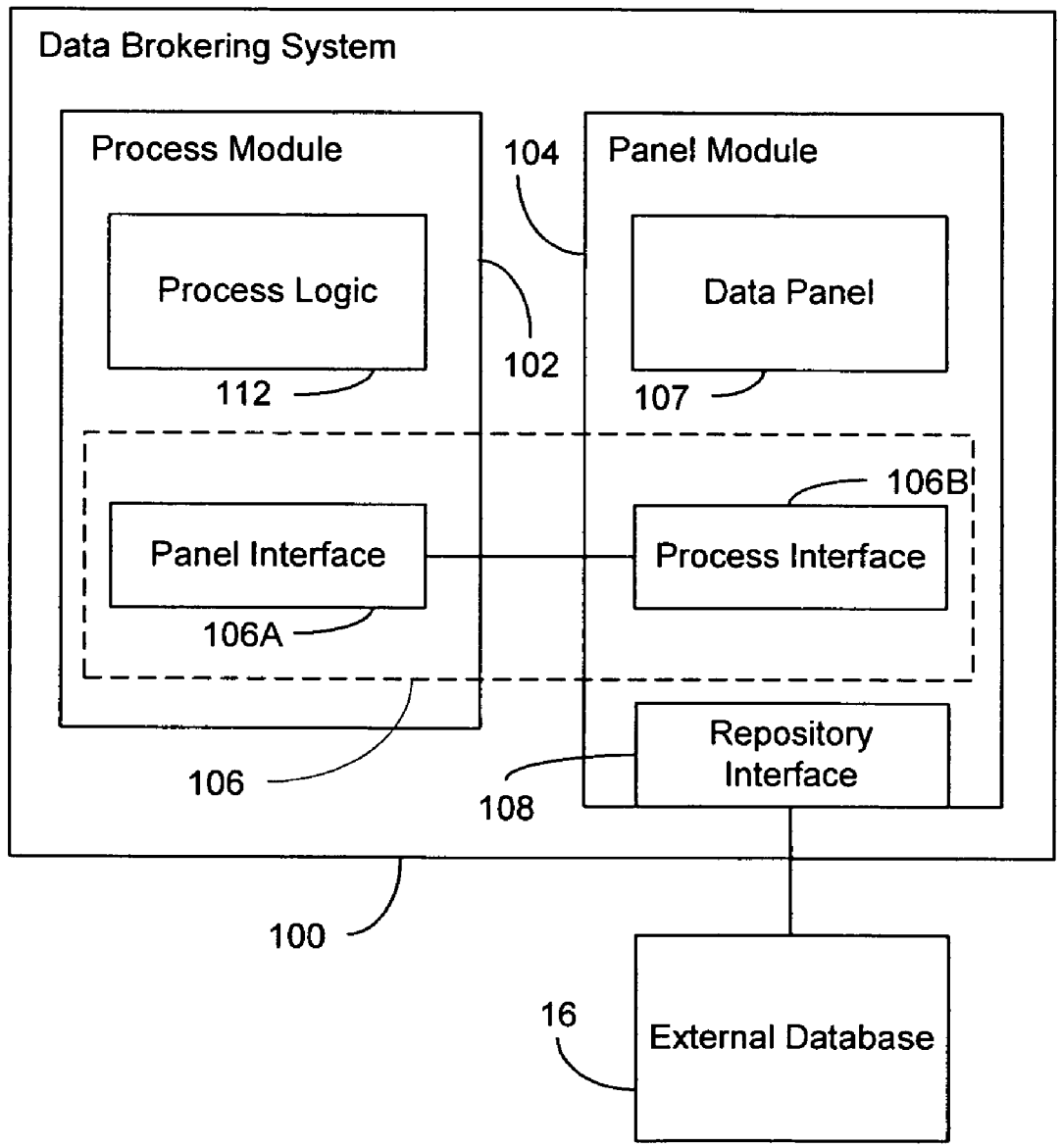
FIG. 5 shows another example of an embodiment of the data brokering system.

FIG. 5 shows another embodiment of the data brokering system 100. The data processing system 100 comprises the process module 102, and the panel module 104. The process module 102 includes a process logic component (or script) 112 for executing process logic, and a panel interface 106A for communicating with the panel module 104. The panel module 104 includes a data panel 107, and a process interface 106B for communicating with the process module 102. The panel interface 106A and the process interface 106B implement the communication standard for the process module 102 and the panel module 104, respectively. Preferably, each panel module 104 has a repository interface 108 for communicating with an external repository or a subschema 17 or table 18 thereof. The panel interface 106A and the process interface 106B communicate using a pre-determined standard of communication.

In the data brokering system 100, process module 102 information may be shared at the panel module 104 level. This user-centric integration provides a consistent user interface and an integration level that is abstracted from the underlying database 16 and application. Advantageously, the panel module 104 does not need to expose any of the user application data beyond what is available on the panel module 104.

Figure 6:
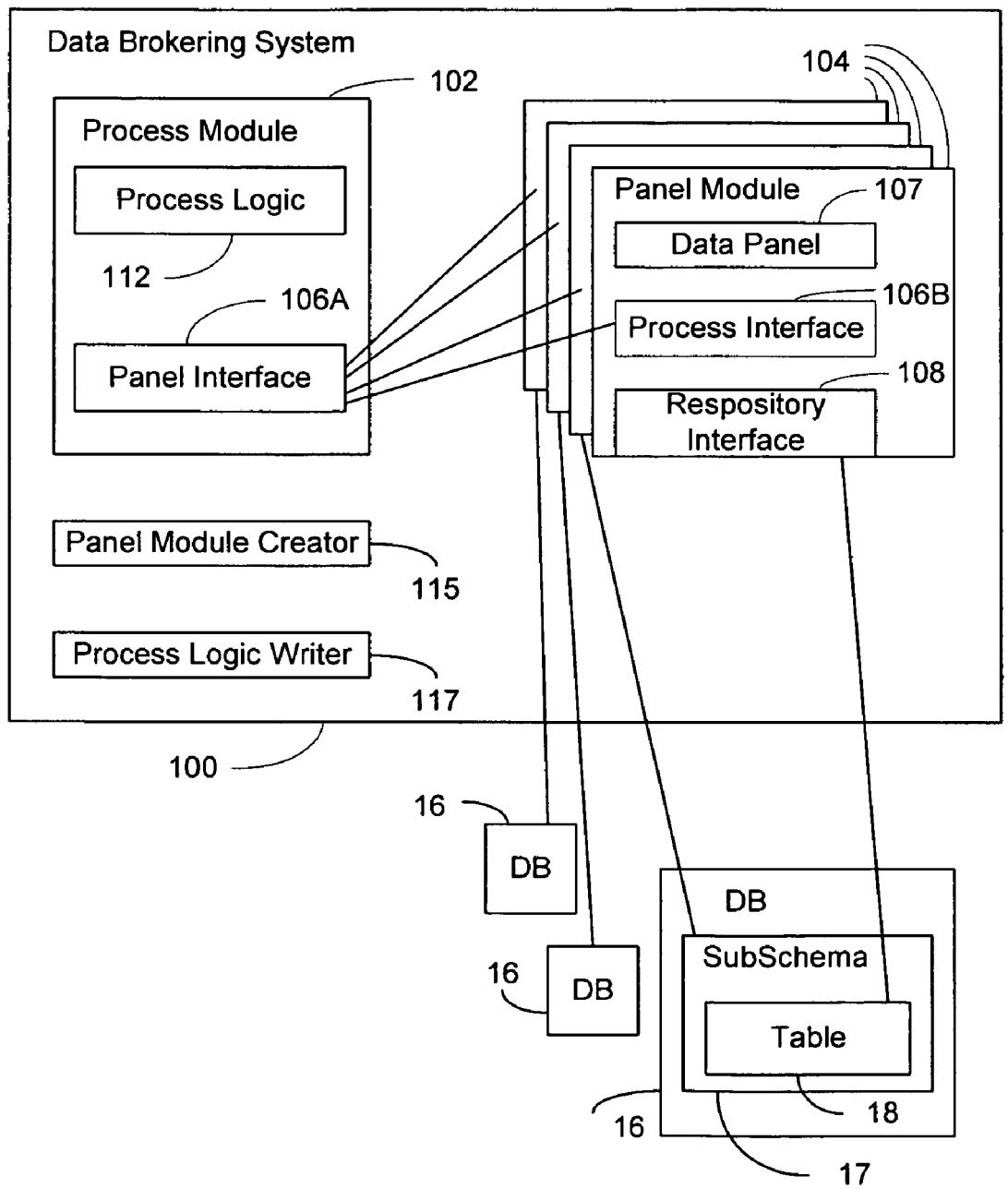
FIG. 6 shows an example of an implementation of the data brokering system.

FIG. 6 shows an example of an implementation of the data brokering system 100 operating on multiple repositories. The data brokering system 100 comprises the process module 102, a plurality of panel modules 104, and a process-panel interface 106. A panel module 104 includes a data panel 107. The plurality of panel modules 104 preferably broker information from a plurality of repository tables 18, a plurality of repositories 16, or a combination of both. The panel modules 104 are independent, and thus are not aware of the presence of other panel modules 104. Although independent, information can be shared by the panel modules 104 through the process module 102. Other components may be added to the data brokering system 100, including a process logic writer 117 and a panel module creator 115.

In one embodiment, the panel modules 104 may obtain information from a user through prompts or other means in the data panel 107. The panel modules 104 may also display in the data panel 107 information obtained from a repository 16, a user, or a script. Advantageously, the data brokering system 100 allows for simplified application design that allows multiple database 16 access without the need for application middleware.

Present software applications require user interfaces 12 to be created as part of the process logic 14. This requires repeated coding of these interfaces as each process logic 14 is created. Advantageously, the data brokering system 100 allows programming to be designed using a process model in software application design rather than a transactional model. Entities that operate a data brokering system 100 can automate their business policies and procedures. External information, process logic, and panel modules may be independently modified without adversely affecting the other components. Advantageously, the data brokering system 100 and method 120 allows access to various data sources without each data source being aware of the other, and no middleware is required. Advantageously, the data brokering system 100 and method 120 utilize discrete panel modules 104 that are independent of each other and independent of the process module 102, optimizing the creation of panel modules 104 that can be used repeatedly by a plurality of process modules 102.

Figure 7:
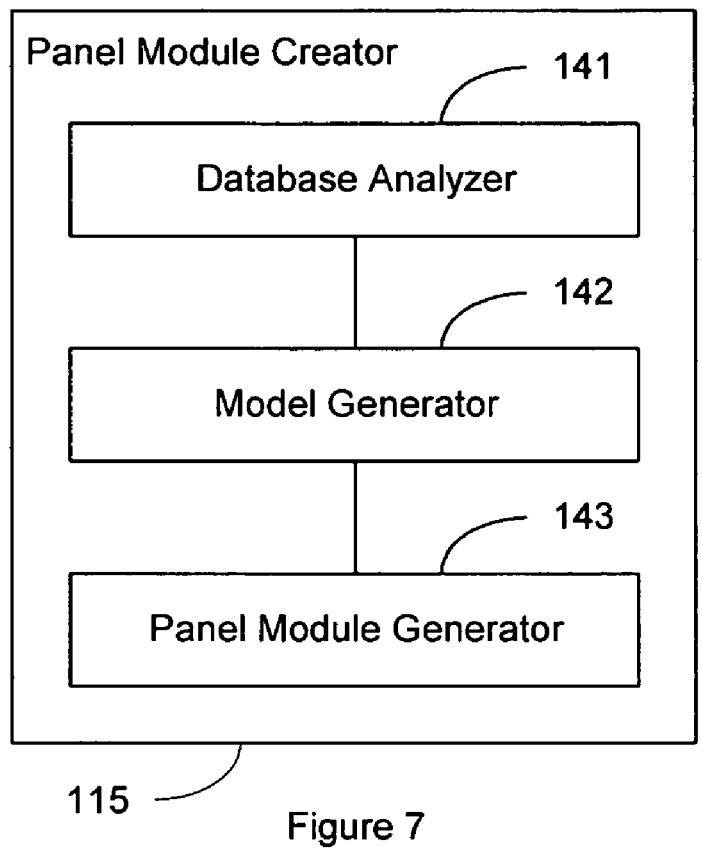
FIG. 7 shows an example of a panel module creator, in accordance with an embodiment of the data brokering system.

FIG. 7 shows an example of a panel module creator 115, in accordance with an embodiment of the present invention. The panel module creator 115 comprises a database analyzer 141 for analyzing the schema of a database to determine relationships between tables in the database, a model generator 142 for generating a data model based upon the database schema, and a panel module generator 143 for generating a panel module 104 and a corresponding process interface 106B (or components related to the process-panel interface 106 for this panel module 104).

Figure 8:
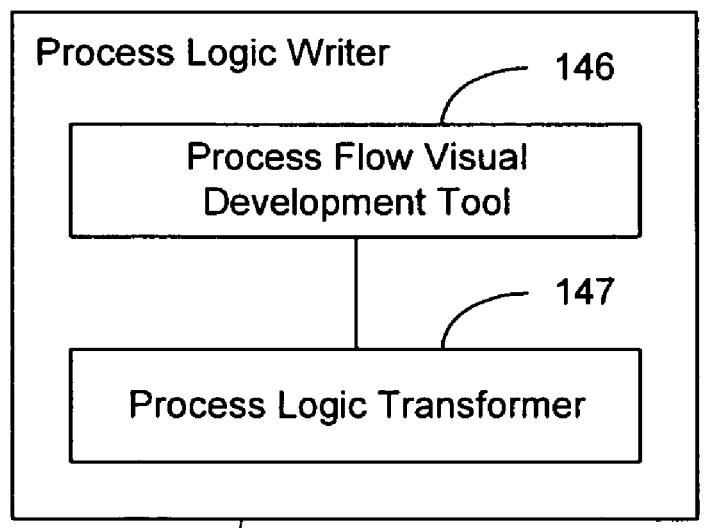
FIG. 8 shows an example of a process logic writer, in accordance with an embodiment of the data brokering system.

FIG. 8 shows an example of a process logic writer 117, in accordance with an embodiment of the present invention. The process logic writer 117 comprises a process flow visual development tool 146 for holding a flowchart representing a desired process flow, and a process logic transformer 147 for transforming the flowchart into process logic. Preferably, the process logic is a script.

The data brokering system 100 can be adapted to many types of programming. In one embodiment, an event management system applies the data brokering system 100 to manage workflow. This embodiment is described below.

Event Management System

In one embodiment, the data brokering system is implemented in an event management system. The event management system is a framework for software design that allows software programs to be designed in a pervasive manner such that the interaction with the computer environment takes place at the earliest possible point in the life of an event, procedure or process as defined by business needs. The event management system further allows the process logic of an event to be moved to different users, making each instance of a process unique.

In one example of an embodiment of the event management system, the system is a workflow application container. In one implementation of the workflow application container, its core includes a workflow definition language (implemented in the process-panel interface 106) and processing engine (implemented in the process module 102). This is complemented by a user interface (implemented in the panel module 104) and backed by a peer-to-peer messaging server to keep all user information synchronized.

An event management system applying the data brokering system 100 is driven by events. An event is defined as the execution of a process. Events can be viewed as triggering various workflow processes. An individual involved in the process will be directed what to do as opposed to deciding themselves what to do. Thus, the event management system allows for workflow to be a process model in software application design rather than a transactional model. Advantageously, entities that operate an event management system can automate their business policies and procedures.

An event can have different states (in-progress, suspended, waiting on information, completed, etc.), and can be passed to other users or spawn a new event to a new user or to itself. Each event initiates new workflow and can have associated states. Preferably, an event server manages the events and calls up the associated workflow process logic 112 and panel modules 104. The event management system provides for less complexity between discrete components and has less interconnects. Panel modules 104 can be re-used by different workflow process logic 112 as they are not embedded within a discrete application and applications can be more user specific.

The event management system may further comprise an internal repository having an event data repository 113 for storing event life-cycle information. Advantageously, this allows an event to be suspended and resumed by the system, as well as assist in the sharing of information between independent panel modules 104. Events defined within the process module 102 may be initiated, transferred, paused, suspended, resumed, and processed until the workflow has been fully satisfied. The event management system retains a log of the full event life-cycle in the event manager data repository 113. The event state and dialog history is available to all user's handling the event. The event management system may also include a script repository 111 for storing scripts (process logic 112) executed by the process module 102. Alternatively, the scripts (process logic 112) can be located in the process module 102.

Preferably, the event management system further includes a permission-based authorization layer. The visibility of user events is completely definable and is not limited to an organizational hierarchy. Such a permission-based authorization layer controls user access to information by managing user access to panel modules 104.

Figure 9:
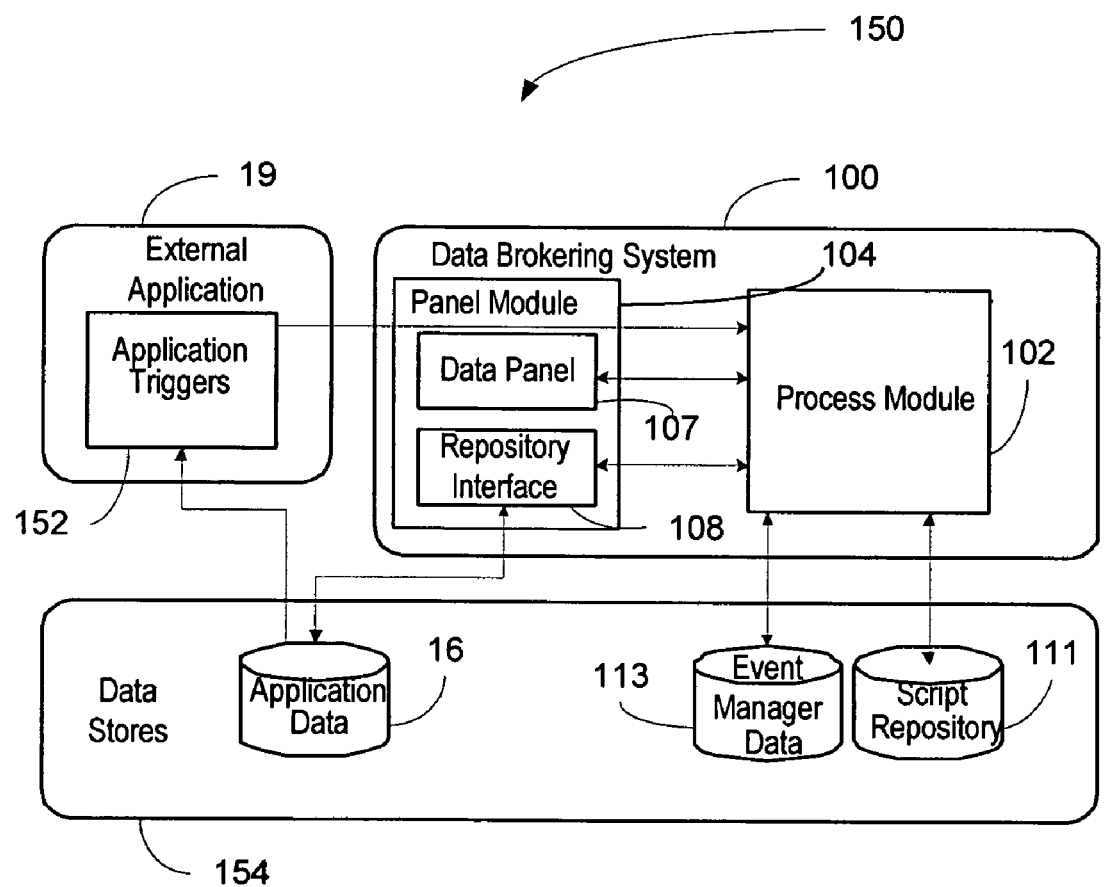
FIG. 9 shows an example of an event management environment, in accordance with an embodiment of the data brokering system.

FIG. 9 shows an example of an event management environment 150 depicting event management system components and their relationship to external applications 19 and data stores 154, in accordance with an embodiment of the data brokering system 100. The event management environment 150 comprises an external application 19 having application triggers 152, an implementation of the data brokering system 100, and a data store 154 having an application data repository (or external repository) 16, a data repository 113, and a script repository 111.

The data panel 107 component defines the screens used to display/edit the application data. The repository interface 108 component defines the path to/from the application data repository 16.

Data stores 154 depict where the event management system retrieves and stores event state information and script definitions. Preferably, the process module 102 does not directly access the application data, but instead uses the repository interface 108 of the panel module 104. An application provider may supply appropriate application controller plug-ins to include in the repository interface 108.

External applications may signal new events in the event management system. The process module 102 handles the distribution of the new event to the appropriate user through load-balancing algorithms. A group manager may also oversee event queue management and provide approvals, pull/push events to other users.

Figure 10:
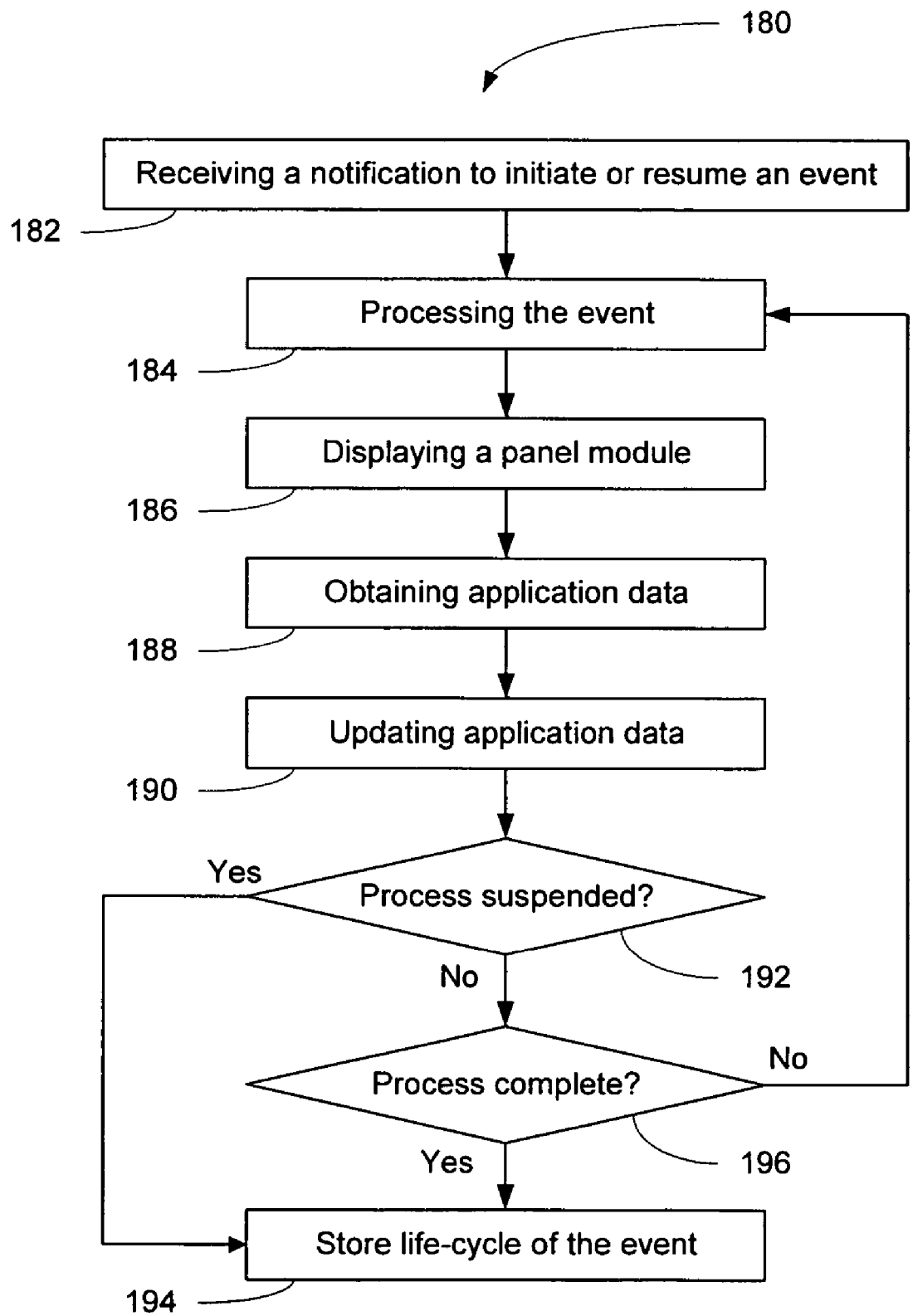
FIG. 10 shows in a flowchart an example of a method of event processing, in accordance with an embodiment of the data brokering system.

FIG. 10 shows in a flowchart an example of a method of event management 180, in accordance with an embodiment of the data brokering system 100. The method (180) begins with receiving a notification to initiate or resume an event (182) from an external user application 19. Next, the system processes the event (184). In the processing of the event, a data panel 107 of a panel module 104 may be displayed (186). The process module 102 instructs a panel module 104 to obtain application data (188) from an application repository 16 through the repository interface 108 of the panel module 104. If the data is modified in the processing of the event (184), then the application data is updated (190) in the application repository 16. During the processing of the event (184), the event may be suspended. If the event is suspended (192), the life-cycle of the event is stored (194). Otherwise (192), if the process is not complete (196), then the method continues processing the event (184). Once the process is complete (196), the life-cycle of the event is stored (194). Other steps may be added to the method (180), including obtaining an appropriate script to process the event.

The process module 102 monitors the event status and escalates events based on user-defined criteria in a typical event management software fashion. Notifications issued follow the escalation paths defined within the event management system. An escalation may initiate a new event to signal additional follow-up.

Figure 11:
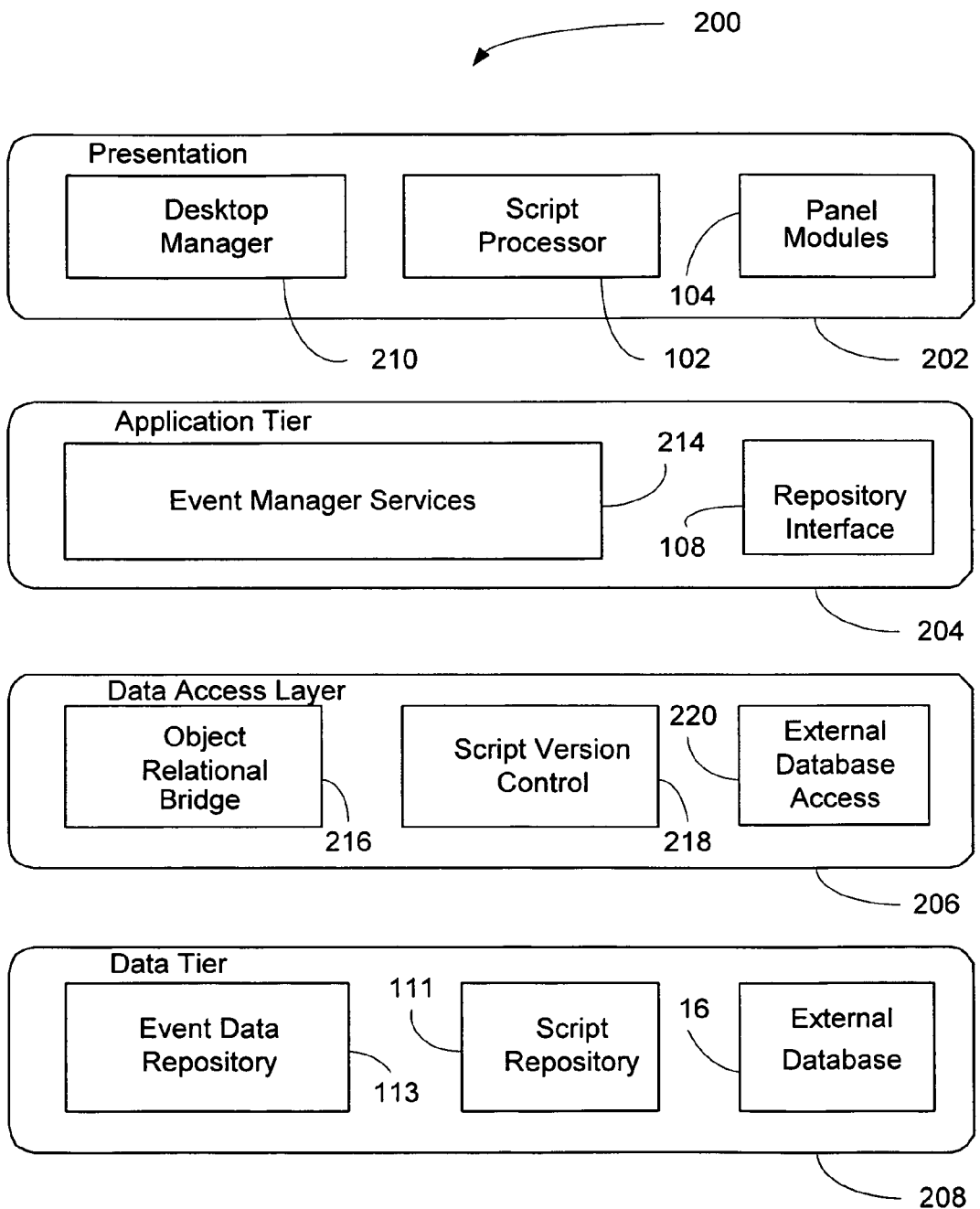
FIG. 11 shows an example of an implementation of a logical application architecture of an event processing system, in accordance with an embodiment of the data brokering system.

FIG. 11 shows an example of an implementation of a logical application architecture 200 of the event management system, in accordance with an embodiment of the data brokering system 100. The logical application architecture 200 separates the event management system into four main tiers of presentation 202, application 204, data access 206, and data 208. An event management system client comprises the presentation layer 202. The script processor (or process module 102) and desktop control 210 are included within the presentation layer 202. The application layer 204 is addressed within an event management system server. The server comprises a number of services 216 each specialized to handle specific features of the event management system. The data access layer 206 is separate from the actual data tier 204. Preferably, the event management system uses an object relational bridge in its data access layer 206. An application of the event management system may use any data access method available to the data panels 104. Components of the data brokering system 100 are implemented in each of the above tiers. These components are coded to the event management system interface and then plugged into the event management system. The component model for the event management system, at a high level, includes components (subsystems, components, and subcomponents) that make up the overall event management system, and the interfaces that connect them together.

One advantageous feature of the event management system is its ability to allow soft coding of procedural workflows, integrating them with both manual and computer processes and to manage this dynamically. The event management system accomplishes this by providing a framework (i.e., the process module 102) within which events may be defined, versioned and processed (for example, through a scripting language). Users of the event management system may customize the process module 102 workflow to meet their specific business needs and adjust the workflow as their business needs change.

The event management system and method 180 take a different approach than current software application in creating workflow programs by being process focused, event driven and interactive with multiple databases running on disparate operating systems. One difference is that the process logic of an event can be moved to other users in various states of completion without interrupting the process. The process logic can also be modified or changed and implemented automatically without having to stop and restart the application while maintaining the integrity of those events already processed.

Normal software programs have process logic hard coded into them. Making changes to procedures requires an information technology (IT) department to change the code to have the application function differently. The event management system and method 180 solve this problem by dynamically initiating process logic each time a new event is created and moving this version of the process logic as part of the processing of the event. Changes to procedures are accomplished by changing the event template, thus a new event picks up the change but old events use the old procedures.

Access to multiple databases in the prior art requires middleware to sit between the various application modules and must be set up prior to an application module being created. Advantageously, the event management systems and method 180 allow access to various databases 16 without each database 16 being aware of the other. The event template handles all interaction between databases 16 at the time of execution and no middleware is required.

The event management system can be implemented in different ways. One detailed example of an implementation of the event management system is described below.

Detailed Implementation of an Embodiment of the Event Management System

An event management component may be included in the event management system to provide the business logic behind the system. Preferably, connections are established and managed with the client, requests are received and dispatched, escalations are managed and broadcasted, data is retrieved from the data access services, and responses are generated all within the event management system server. Preferably, the event management system server provides services to allow clients to authenticate themselves through the Security component (bypassed when a single sign on solution such as Kerberos is implemented); provides 'state-of-the-world' snapshot details to clients when first connecting; monitors the status of connected clients, dropping any clients that have become inactive; monitors queues visibility; provides escalation notifications when events reach escalation tolerance values; monitors push queues and distributes new events to the appropriate personal queues; and transfers serialized objects as requested by the event management system client, back and forth over the network.

One example of an event management client uses the majority of the other components to build an interactive interface for the user. This interface enables the user to interact with data in the event management system, as well as any data panel 104 running inside of the event management system. Preferably, the event management client provides a user interface for users to authenticate themselves through a security component (bypassed when a single sign on solution such as Kerberos is implemented), provides a user interface for an authorized user to perform data entry for panel module 104 components, provides a user interface for an authorized user to view their queues of events, provides a user interface for an authorized user to integrate data from external data stores, provides a user interface for an authorized user to view a workflow dialogue, communicates with the event management server component transferring serialized objects back and forth over the network, and communicates with the operating system, telling it to display a 'flag' or 'bubble' to the user from the system tray to alert the user to a status change in their queue(s).

Advantageously, integration with the client operating system through a single sign on and automatic change notification in the system tray makes for a more user friendly product. Logical and physical separation of generic parts of the event management system ensures a reusable and extensible design. The client/server architecture enhances performance and usability, and makes the application easier to maintain.

Figure 12:
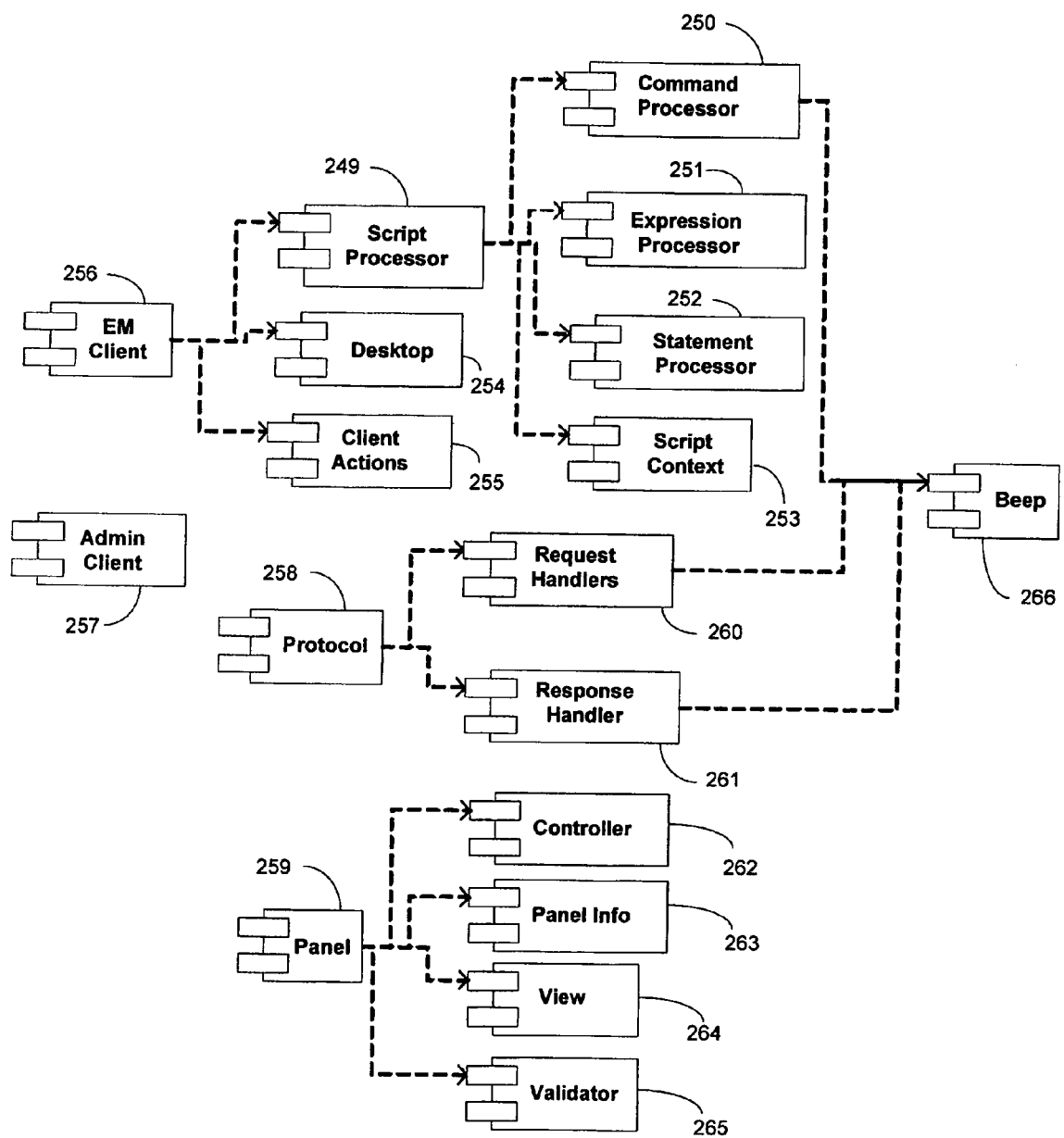
FIG. 12 shows an example of an implementation of a client model of an event processing system, in accordance with an embodiment of the data brokering system.

FIG. 12 shows an example of an implementation of a client model, in accordance with an embodiment of the data brokering system 100. The following table identifies some of the components that comprise the event management client. Other components may be added to, or removed from, this table.

| Component Name | Description |
| --- | --- |
| Script Processor 249 | This component governs the execution of the script. The interfaces provide actions to the script itself, such as the forward and rewinding of the script. Handling of the expressions and commands found within a specific script statement are handled by subpackages described below. |
| Expression Processor 251 | This is a component of the script processor 249 package and handles the evaluation of the expressions used within a script. |
| Command Processor 250 | This is a component of the script processor 249 package and supplies the logic necessary to carry out the script command. |
| Statement Processor 252 | This is a component of the script processor 249 package and supplies the logic necessary to perform the programming step described by the statement. |
| Desktop 254 | This component provides the user interface layer. |
| Client Actions 255 | This component provides the actions required by the desktop 254. |
| Protocol 258 | This component defines the communication protocol used by the event management system. This component uses two subcomponents; protocol request handler 260 and protocol response handler 261. |
| Panel 259 | The panel component defines the base panel information to the event management system. Application modules are implemented into the panel component and its subcomponents; panel controllers 262, panel information 263, panel view 264 and panel validation 265. |
| EM Client 256 | The application that the users of the event management system interact with. Users log in with their assigned username/password and are shown a list of the open events on their queue and any queue they have view 264 permission to. The user can: view all the events they have permission to view, resume and work with events they have on their queue, claim events on other user's queues that they have permission to claim from, push events to other user's queues that they have permission to push to |
| Admin Client 257 | This is the application that administrative users of the event management system interact with. Special functionality is available to manage queues, permissions, event types, scripts, users, passwords, etc. Typically only a few people in an organization will have access to this functionality. |
| Script Context 253 | This is the environment in which the script runs. There is one script context 253 for each running event. It provides the script processor 249 with hooks into the application, such as the ability to open new panels and add new prompts. |
| BEEP 266 | Stands for Blocks Extensible Exchange Protocol. All event management client/server communication uses BEEP as the protocol for message transmissions. |
| Request Handler 260 | For each type of message that can be passed from client to server, there is a request handler 260 registered to take the appropriate action |
| Response Handler 261 | The response handler 261 is responsible for constructing and returning the appropriate response. |
| Controller 262 | This component is responsible for loading a panel model given a list of parameters. Typically, there is one panel controller 262 for each panel 259. Controllers 262 are also responsible for saving panel model information back to the datastore. |
| Panel Info 263 | This component publishes information about panel 259 capabilities. This includes which fields appear on the panel how the user is allowed to interact with them. |
| View 264 | This is the component that actually displays the panel 259 on screen and provides the user with a means of editing some or all of that information. |
| Validator 265 | This component validates the values collected on a panel 259 to ensure they meet business requirements. |

A script processor component 249 may be added to the event management system or implemented separately to provide the script statements and scripting logic for the 'softcoding' used by the process module 102. Preferably, XML is used because of its flexibility and extensibility, as well as its ability to simply and effectively model complex data and data structures. Preferably, XPath is used to record current progress through the script. Preferably, data bus is used to manage variable storage and to provide conduit for panel module 104 to process module 102 and process module 102 to panel module 104 data transfer. Preferably, the instructions in the script are processed in a typical fetch-execute cycle, where the next instruction is 'fetched' and then decoded and 'executed'. The following are some notable exceptions to the typical fetch-execute cycle:

The script may be rewound. A rewind statement moves the 'instruction-pointer' to the step just prior to the last decision point in the script. While rewinding, any panel modules 104 and prompts added to the desktop are removed.

XPath is used as the 'instruction-pointer'. It points to the node in the script document currently being executed.

The script may be suspended at any point. This saves the script context and the instruction-pointer to the event database.

The script is replayed when it is resumed from a suspension. Each statement along the path to the last node performed is once again executed in 'replay' mode.

Preferably, variables created, set and read during the course of processing a script are stored within the script context. Each executing script has a single script context. This is a single scoped language.

Preferably, when an event is suspended the script context is saved. When the event is resumed the context is reloaded and the script is played up to the point that it was suspended. Interaction between panels 259 is handled through the script context. A panel module 104 may export its values to the script context. A panel module 104 may listen for changes to the value of variables within the script context.

A statement processor 252 may be added to the process module 102 to handle statements supported in the scripting language. Preferably, the following statements are supported by this component. Each statement has its operations described at a high level. Other or fewer statements may be supported.

| Statement | Description |
|---|---|
| choose | The choose statement defines a conditional block containing multiple conditional test. Each condition to test is defined within a when statement. There may be one or more when statements contained within a choose block (between the <choose> and </choose> tags). The choose block must also contain an otherwise statement. |
| column | The column statement creates a new column header that is registered to display the value of a variable. If the variable has a value when the column statement is executed, then that value is displayed, otherwise no value is displayed (but the column is still added). Whenever the value of the variable changes, the value displayed in the column is also changed (no need to re-execute the column statement). |
| comment | The comment statement opens up the comment dialog and allows the user to enter a comment. |
| commit | A commit statement defines a point in the Script at which processing should pause for user input. Once the user has responded to the prompt statements or has filled in panel details, the user would continue the script processing by pressing the Play (forward) button. |
| decision | A decision statement defines a point in the Script at which processing should pause for user input. Once the user has responded to the prompt statements or has filled in panel details, the user would continue the script processing by pressing the Play (forward) button. |
| end | The end statement signals that the event has been completed and may be closed. |
| goto | The goto statement transfers control to the statement identified by the specified label. |
| if | The if statement defines a conditional block. When the if statement is encountered the test expression is evaluated. If the result is true, the statements within the if block (between the <if> and </if>) are executed. If the result is false, the statements within the if block are not executed. In either case, the process then continues with the statement after the close of the if block. |
| interval | The interval statement allows the suspension interval for the event to be set. The suspension interval is both the default suspension time limit and the maximum suspension time limit. When a user suspends the event, the interval defined by this statement is used to compute the suspension period. The user may then change that value to a smaller time limit. |
| label | The label statement defines a target for a goto statement. |
| new event | The new-event statement causes a new event to be initiated or spawned onto the specified queue. The new-event may pass parameters to the spawned event. |
| panel | The panel statement is used to add a panel module 104 to an event management system desktop. Properties on the panel module 104 may be set by the panel statement. If one or more properties define the key to the underlying domain information, the panel module 104 is loaded with the information from the database. |
| prompt | The prompt statement requests additional information from the user. It does this by adding a new line to the dialog box. The line consists of two parts, a string identifying the input that is requested, and an entry field, or control with which the user may enter the value. |
| query | The query statement initiates a request to the database and stores the result in the specific variable. The request must be one of the predefined named queries. Preferably, a list of named queries is provided with process module 102. |
| return | The return statement will cause the processing to continue at the statement following the previous goto statement. The use of a goto statement and a return statement is similar to performing a subroutine call. |

-continued

| Statement | Description |
|---|---|
| send email | The send-email statement sends an email to the recipients defined within the parameters. The email will either be sent using the local email client or by submitting the email to the specific Simple Mail Transfer Protocol (SMTP) server. |
| set | The set statement assigns a value to a variable. If the variable does not exist, the set statement will create the variable. |

An expression processor may be included in the process module 102 to evaluate expressions contained within a script statement. In one embodiment, this is based on the Mozilla™ Rhino open source implementation of Javascript 1.5. Expressions may contain references to variable and data panel 107 fields.

A command processor 250 may be included in the event management system to handle statement commands supported in the scripting language.

script processor 249 to provide the logic for the script used to 'soft-code' the business functionality.

Figure 13:
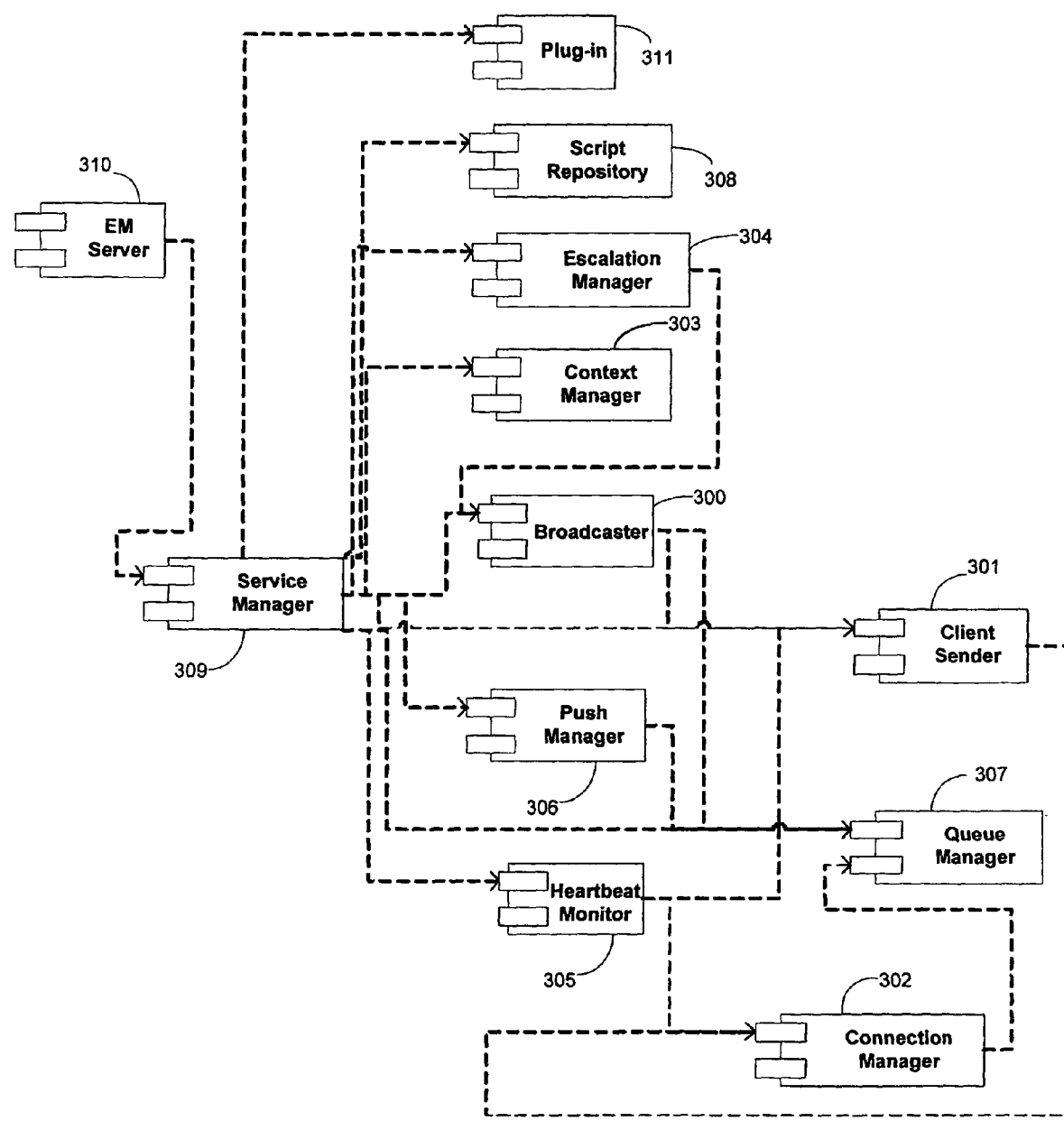
FIG. 13 shows an example of an event management system server model, in accordance with an embodiment of the data brokering system.

FIG. 13 shows an example of an event management system server model, in accordance with an embodiment of an event management system. Some of the basic logic is described in more detail below. The following component table identifies some of the components that comprise an event management system server. Other components may be added to, or removed from, this table.

| Component Name | Description |
|---|---|
| Broadcaster 300 | This component sends a message to one or more clients. |
| Client Sender 301 | This component relays a single message to the connection manager. |
| Connection Manager 302 | This component manages a list of connections and provides the services to send messages to clients on each connection. |
| Context Manager 303 | This component maintains a pool of contexts. |
| Escalation Manager 304 | This component monitors for events that have reached a point where an escalation notice must be sent and initiates the transmission of the notice. |
| Heartbeat Monitor 305 | This component pings each connected client to check that the connection remains valid. Any invalid connections are dropped. |
| Push Manager 306 | This component monitors events placed on 'push queues' and then distributes the events to the appropriate user based on various load-balancing algorithms. |
| Queue Manager 307 | This component maintains the list of queues and controls the access to the queues. |
| Script Repository 308 | This component manages the script versions. It is a plugable component and may be implemented by a repository or a back end database. |
| Service Manager 309 | This component oversees all services enabled within the event management system server. |
| EM Server 310 | This component contains one service manager 309 for each environment (e.g. dev, test, prod) and coordinates starting and stopping of these service managers 309. |
| Plug-in 311 | This is the plug point for applications to hook into the event management system server 310. New applications implement the plug-in 311 interface and they are picked up at runtime by the server 310. |

A desktop component 254 may be implemented in the event management system to support its user interface. It provides a consistent interface to the event management system user.

An event management system administration may be implemented as a separate application to provide administrative functionality for the system. It allows administrative users to manager user profiles in the process module 102, as well as 'soft-code' the business functionality by writing 'scripts'. Preferably, the event management system administration provides a user interface for administrative users to view and enter data for the administrative functions, provides a user interface for administrative users to 'soft-code' business functionality, allows administrative users to override settings for events and queues, and communicates with the A broadcaster component 300 may be included in the event management system server 310 to send messages to one or more clients. The messages may be sent to a single client, to all clients viewing a particular queue, or to all clients viewing a queue for a particular event.

A client sender component 301 may be included in the event management system server to relay the message to the communication manager in order to actually send the message.

A connection manager 302 component may be included in the event management system server 310 to maintain a pool of connections. When a client requests a connection, the connection manager 301 provides a connection from the pool. When a client disconnects the connection is returned to the pool. The connection manager 301 is used to send a message to a connected client.

A context manager 303 component may be included in the event management system server 310 to maintain a list of contexts. A context is a serializable collection of objects. In one embodiment of the event management system, the script variable is stored in a script context.

An escalation manager 304 may be included in the event management system server 310 to monitor for events that have reached a point where an escalation notice must be sent and initiates the transmission of the notice.

The systems and methods according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. An event management system for managing processing of a plurality of events by a plurality of users, the event management system comprising:
   a computer readable memory storing instructions; and
   a processor for executing the instructions stored in the computer readable memory, the instructions when executed by the processor providing:
   a panel module for the retrieval and entry of database information from a database;
   a process module comprising a script processor for executing a plurality of scripts, each of the scripts defining processing logic for processing a type of event of an event of the plurality of events, the processing logic including calling the panel module for the retrieval or entry of database information;
   a process-panel interface for defining a standard of communication between the process module and the panel module, the process-panel interface used by the panel module and the process module for communication;
   a plurality of user event queues, each of the user event queues for holding one or more events of the plurality of events for processing by a user associated with the user event queue according to the executed script associated with the event type of an event being processed, each of the plurality of events associated with a script context for storing the execution state of the associated script;
   wherein an event and associated script context may be transferred from one user queue to another user queue for further processing; and
   wherein the processing of the script may be suspended, resumed, rewound or replayed, and the script context stores a current execution point within the execution of the script.

2. The system as claimed in claim 1, further comprising a plurality of panel modules using the standard of communication.

3. The system as claimed in claim 2, wherein the plurality of panel modules broker information from a plurality of repositories.

4. The system as claimed in claim 2, wherein the plurality of panel modules brokers information from a plurality of tables of the repository.

5. The system as claimed in claim 2, wherein the panel modules are independent and indirectly share information through the process module.

6. The system as claimed in claim 3, wherein the panel modules are independent and indirectly share information through the process module.

7. The system as claimed in claim 4, wherein the panel modules are independent and indirectly share information through the process module.

8. The system as claimed in claim 1, wherein the panel module brokers information from a plurality of repositories.

9. The system as claimed in claim 1, wherein the process module obtains information from a user.

10. The system as claimed in claim 1, wherein the panel module includes a data panel for displaying information.

11. The system as claimed in claim 10, wherein the data panel obtains information from a user.

12. The system as claimed in claim 7, wherein the process module includes an interface for managing panel module information.

13. The system as claimed in claim 1, further comprising an internal repository for storing event life-cycle information of the processing of the event.

14. The system as claimed in claim 13, wherein the processing of the event is suspended and resumed.

15. The system as claimed in claim 1, wherein the panel module includes a repository interface to communicate with the external repository.

16. The system as claimed in claim 1, further comprising a script repository for storing scripts used by the process module to process events.

17. The system as claimed in claim 1, wherein the process module further includes:
   an event receiver module for receiving events for processing from an external user application.

18. The system as claimed in claim 1, further comprising a plurality of panel modules.

19. The system as claimed in claim 18, wherein each panel module of the plurality of panel modules are for the retrieval and entry of information to a view of a database.

20. The system as claimed in claim 1, wherein the script context further comprises an event state for storing the state of the associated event.

21. The system as claimed in claim 20, wherein the event state comprises one of:
   an in-progress state for indicating that the associated event is being processed by the process module;
   a waiting-for-information state for indicating that the associated event being processed by the process module is waiting for information from the panel module;
   a completed state for indicating that the associated event is finished being processed by the process module; and
   a suspended state for indicating that the processing of the associated event has been suspended.

22. The system as claimed in claim 18, wherein the plurality of panel modules share information through the script context associated with a common event common to the plurality of panel modules.

23. A method of managing processing of a plurality of events by a plurality of users, the method comprising the steps of:

defining a standard of communication between a process module and a panel module, the process-panel interface used by the panel module and the process module for communication;

executing process logic for processing a type of event of an event of the plurality of events, the processing logic including calling the panel module for the retrieval or entry of database information;

communicating with a panel module, using the defined standard of communication to access external information required for processing the event using the script context associated with the event;

distributing the plurality of events to a plurality of user event queues, each of the user event queues for holding one or more events of the plurality of events for processing by a user associated with the user event queue according to the executed script associated with the event type of an event being processed, each of the plurality of events associated with a script context for storing the execution state of the associated script, each of the user event queues holding the one or more events of the plurality of events on a computer readable medium;

wherein an event and associated script context may be transferred from one user queue to another user queue for further processing; and wherein the processing of the script may be suspended, resumed, rewound or replayed, and the script context stores a current execution point within the execution of the script.

24. The method as claimed in claim 23, wherein a plurality of panel modules use the standard of communication.

25. The method as claimed in claim 24, wherein the plurality of panel modules broker information from a plurality of repositories.

26. The method as claimed in claim 24, wherein the plurality of panel modules brokers information from a plurality of tables of the repository.

27. The method as claimed in claim 24, further comprising the steps of having the process logic access information from a plurality of panel modules.

28. The method as claimed in claim 25, further comprising the steps of having the process logic access information from a plurality of panel modules.

29. The method as claimed in claim 26, further comprising the steps of having the process logic access information from a plurality of panel modules.

30. The method as claimed in claim 25, wherein the panel module brokers information from a plurality of repositories.

31. The method as claimed in claim 25, further comprising the step of obtaining information from a user.

32. The method as claimed in claim 25, further comprising the step of displaying information.

33. The method as claimed in claim 29, further comprising the step of managing panel module information.

34. The method as claimed in claim 25, further comprising the step of storing event life-cycle information of the processing of the event.

35. The method as claimed in claim 34, further comprising the steps of suspending and resuming the processing of the event.

36. The method as claimed in claim 25, further comprising the step of storing scripts used by the process module to process events in a script repository.

37. The method as claimed in claim 25, further comprising the steps of:

receiving an event notification of an event from an external user application;

requesting application data from an external repository;

performing an event script on the external data storing the life-cycle of the event; and updating the external information.

38. The method as claimed in claim 37, further comprising the step of displaying a panel module representing the external information.

39. The method as claimed in claim 37, further comprising the step of obtaining an appropriate script to process the event.

* * * * *